July 14, 1931.    A. E. FROST    1,814,682
LAMINATED SPRING
Filed Aug. 14, 1929    2 Sheets-Sheet 1
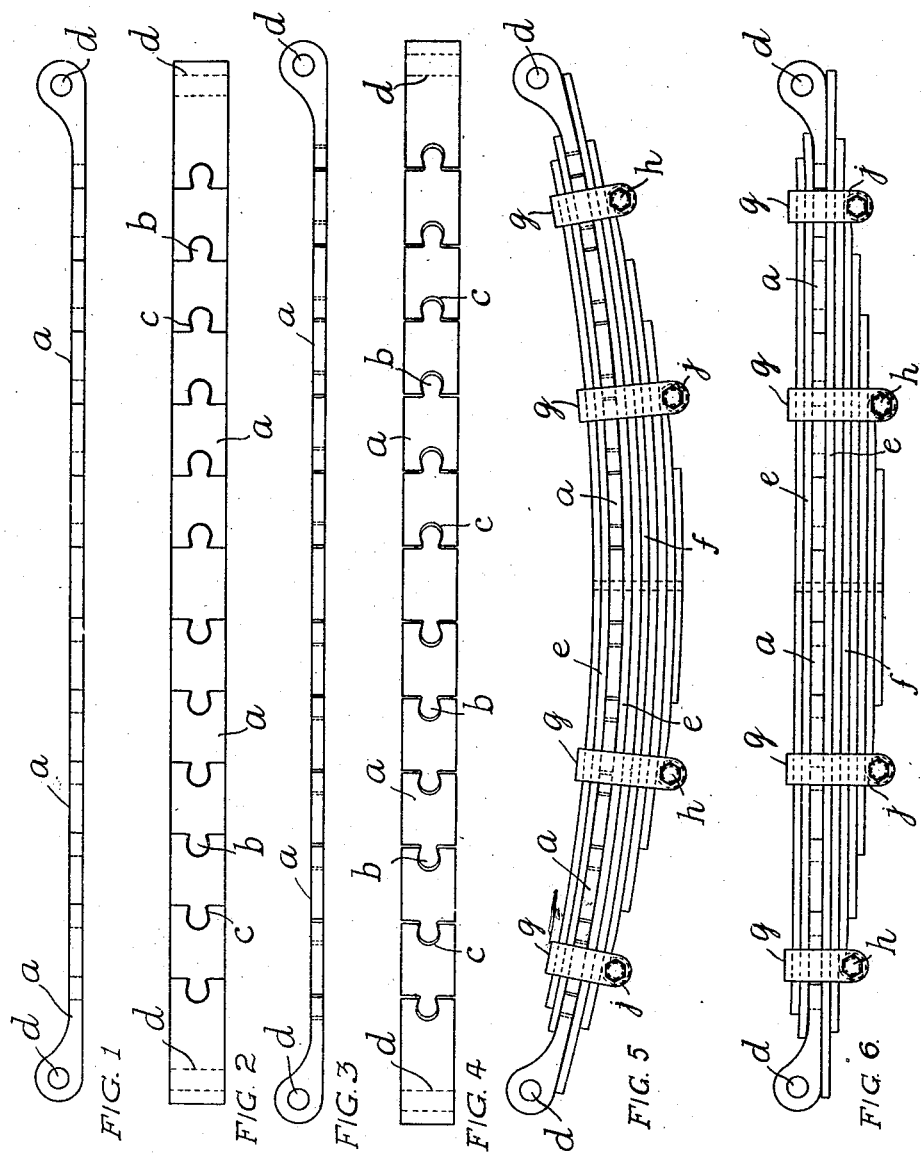
ARTHUR ERNEST FROST, Inventor

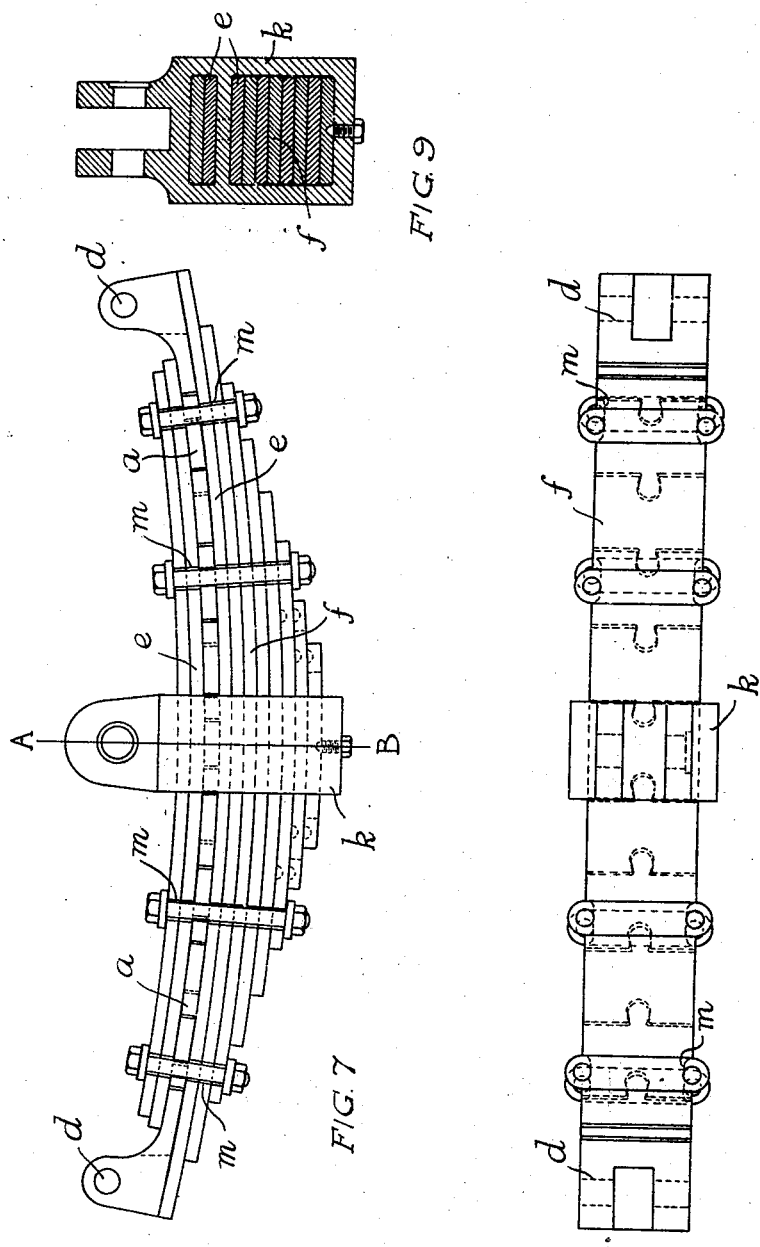

Patented July 14, 1931

1,814,682

UNITED STATES PATENT OFFICE

ARTHUR ERNEST FROST, OF SHEFFIELD, ENGLAND

LAMINATED SPRING

Application filed August 14, 1929, Serial No. 385,829, and in Great Britain April 6, 1929.

This invention relates to laminated springs for use in the suspension of vehicles of all kinds and for other uses to which laminated springs may be applied.

In laminated springs used for the suspension of vehicles, breakages often occur in the master or main leaf for reasons hereinafter described.

The main or master leaf, or as it is sometimes termed, the back plate or top plate, is so called by reason of it constituting the main member by which the whole spring relies for its suspension or support in use.

In mounting laminated springs it is essential that some means be provided at the ends for connecting the spring to the vehicle and in the semi-elliptic type of spring each end is usually connected to the vehicle and the centre is connected to the axle, whilst in the quarter-elliptic type of spring one end is connected to the vehicle and the other end to the axle.

The method usually adopted in connecting that end of the spring which is connected to the vehicle as distinct from the axle, is to provide the main leaf with a form of end or ends adapted to accommodate a pin, and provided with suitable means for such attachment to the vehicle, or in some cases one end of the main leaf is slidably accommodated in a housing or frame attached to the vehicle.

This master leaf, therefore, functions with the remainder of the leaves and is subjected to bending stresses in addition to taking the stresses imposed by transmission of the vehicle.

In designing a laminated spring an endeavour is made to provide a main leaf strong enough to withstand this dual task, but a compromise has to be made in determining the thickness of the leaf, as on the one hand it must be thick enough to withstand the forces imposed by transmission, whilst on the other hand it must be thin enough to keep down the stress due to flexion within a margin of safety. As a result, therefore, of this compromise, the strength of the main leaf is somewhat limited, but with a view to strengthening it, one or more additional leaves, known as "re-bound" plates have been introduced adjacent the main leaf in order to reinforce it, whilst in some cases the master leaf has been formed of two parts suitably coupled at the centre.

In the methods adopted, therefore, the feature that the master leaf should be subject to bending stresses due to flexion as well as to stresses due to transmission is common to them all, and for this reason all attempts to prevent failure or breakage have failed, for it is obvious that under such conditions the whole spring is only as strong as the weakness of the master leaf to fulfill its dual purpose.

By this invention it is sought to provide improvements which will overcome the failures and breakages above-mentioned, and to this end, therefore, a laminated spring is provided with an extensible and contractible supporting or suspension member or plate that is not subjected to the usual bending stresses on the flexion of the spring, yet flexibly accommodates itself to and assimilates the curvature of the spring.

A spring made according to this invention, therefore, comprises a plurality of laminations wherein the supporting or suspending means comprises an articulated or disjointed member disposed within the laminations so arranged and adapted as to non-resiliently accommodate itself to the varying curvature of the laminations under stress.

Preferably the member or plate comprises a plurality of elements movably connected with one another and accommodated between two adjacent leaves or laminæ of an assembled spring, said elements being capable of individual and combined movement so as to accommodate themselves to curvature of the spring under stress, exposed ends of said member being adapted, or provided with means, for connection to a vehicle. At least one of said elements may be adapted, where desired, for connection to the assembled spring or a leaf thereof.

Further, one of the elements may also be adapted or provided with means for securing it to the axle.

Further still, one of the elements may be adapted or provided with means, for constituting or forming part of the buckle or other fastening for connecting the several leaves or laminæ of the spring together.

The elements are, or may be so formed or provided with means for preventing other than designed displacement. They may be flat, arcuate, or other convenient shape according to requirements, and of any suitable metal or material.

Where convenient or desirable, the elements may be connected by the introduction of a separate unit or units, and the joints forming the coupling may be of rounded form resembling a ball joint.

Further, more than one connection between each pair of elements may be provided and said connection or connections may be of substantially the same thickness as the elements, or of a different thickness.

The invention will be better understood on reference to the accompanying sheets of drawings, in which Fig. 1 is an elevation of one form of suspension member made in accordance with this invention and shown in its fully contracted position;

Fig. 2 is a plan of same;

Fig. 3 is a similar view to Fig. 1, but showing the suspension member in its extended position; and Fig. 4 is a plan of same;

Fig. 5 is an elevation of an assembled semi-elliptic spring embodying the form of suspension member depicted in Figs. 1 to 4, the spring and suspension member being shown in the normal position;

Fig. 6 is an elevation illustrating the spring shown in Fig. 5 flattened out under stress;

Fig. 7 is an elevation of a spring embodying a modified form of suspension member;

Fig. 8 is a plan of same;

Fig. 9 is a section on the line A—B, Fig. 7.

The form of suspension member depicted comprises a plurality of separate elements $a$, $a$ capable of being coupled together as shown by a lug $b$ on one element engaging a slot $c$ in an adjacent element in such a manner that although said elements cannot be pulled completely apart longitudinally they can be pulled slightly apart to permit of extensibility of the member as seen in Figs. 3 and 4, the two end elements being formed with an eye $d$ for the reception of the usual pin provided on a vehicle for suspending a spring.

In use, the articulated suspension member is accommodated in a similar manner to the usual master leaf between two adjacent leaves or laminæ $e$ of a spring $f$ as shown in Figs. 5 to 8, and adapts itself to the curvature thereof, the several laminæ being held together in any well known manner, as for example by the usual shackles $g$ which are secured by bolts $h$ passing through eyes $j$ formed at the ends of some of the laminæ as shown in Figs. 5 and 6, the spring being mounted on pins (not seen) passing through the eyes $d$ of the end elements. The centre element $a$ is, or may be connected along with the remaining laminæ $e$ to an axle in any convenient manner.

In use, when the spring $f$ is not under stress, the articulated member is extended when employed in the semi-elliptic type of spring as illustrated, and on the spring $f$ flattening out under load or shock, the elements $a$ close on to one another whereby the articulated member assumes a contracted length whilst adapting itself to the alteration in curvature of the spring. On re-action of the spring $f$ the elements $a$ open again.

It will, therefore, be seen that the spring $f$ can be mounted, if desired, about fixed centres.

It will also be seen that owing to the extensibility and contractibility of the articulated member in adapting itself to the varying curvature of the spring, said member is free from the bending stresses to which the usual master leaf is subjected and has only the horizontal forces to contend with. The remaining leaves or laminæ of the spring are, therefore, permitted to function more easily with the result that the stresses to which the spring is subjected are more evenly distributed.

It is to be understood that the elements $a$ may be of any suitable form and although they are in the examples illustrated shown as straight pieces they may be arcuate or other convenient shape as desired.

Further, the connection of one element with another may be of any suitable form other than that illustrated and the extent of movement between the elements may vary according to the conditions met with.

Lateral displacement of the elements is prevented by the form of connections between them, but other means may be employed for the same purpose, for example the elements may have slidable engagement with an adjacent leaf of the spring.

Also any of the elements may be provided with lugs or otherwise adapted for the attachment or accommodation of the shackles $g$ or other fastenings and the end elements may be of any shape adaptable for mounting the spring in any desired and convenient manner.

In Figs. 7, 8 and 9, is illustrated a spring embodying a modified form of articulated suspension member in that the centre element $a$ is formed integral with the buckle $k$, thus permitting the spring and buckle to be securely attached and bound together without necessitating the usual pre-heating of the buckle and attachment under hydraulic pressure, and thereby eliminating the danger of malformation of machined dimensions. Also some of the elements are notched along with the other leaves of the spring as shown at $m$ for accommodating engaging sides of the shackles g, the bolt heads and nuts in the plan, Fig. 8 being omitted.

It is also to be understood that this invention is applicable to all or most types of laminated springs and including the straight type and the quarter-elliptic type of spring.

What I claim and desire to secure by Letters Patent is:—

1. A laminated spring comprising a plurality of laminations wherein the supporting or suspending means comprises an articulated member disposed within the laminations so arranged and adapted as to accommodate itself to the varying curvature of the laminations under stress, said articulated member being bound together with the laminations.

2. A laminated spring comprising a plurality of laminations wherein the supporting or suspending means comprises an articulated member disposed within the laminations so arranged and adapted as to accommodate itself to the varying curvature of the laminations under stress, and means for embracing said articulated member and the laminations.

3. For a laminated spring, an articulated suspension member comprising a plurality of elements movably connected one to another to create extensibility and contractibility in said articulated suspension member, extreme elements being adapted for connection to a vehicle.

4. For a laminated spring, an articulated suspension member comprising a plurality of elements movably connected one to another to create extensibility and contractibility in said articulated suspension member, said elements being connected by a tongue and slot engagement of one with another, extreme elements being adapted for connection to a vehicle.

5. A laminated spring comprising a plurality of laminations wherein the supporting or suspending means comprises an articulated member so arranged as to non-resiliently accommodate itself to the varying curvature of the laminations under stress, said articulated member comprising a plurality of elements so coupled one to another in a single line as to be capable of relative movement to give extensibility and contractibility in the member.

6. A laminated spring comprising a plurality of laminations wherein the supporting or suspending means comprises an articulated member so arranged as to non-resiliently accommodate itself to the varying curvature of the laminations under stress, said articulated member comprising a plurality of elements so coupled one to another in a single line as to be capable of relative movement to give extensibility and contractibility in the member, and means for embracing said suspension member and the laminations.

7. A laminated spring comprising a plurality of laminations wherein the supporting or suspending means comprises an articulated member so arranged as to non-resiliently accommodate itself to the varying curvature of the laminations under stress, said articulated member comprising a plurality of elements so coupled one to another in a single line as to be capable of relative movement to give extensibility and contractibility in the member, and means for embracing said articulated member and the laminations, said means being integrally combined with said articulated member.

In testimony whereof, I affix my signature.

ARTHUR E. FROST.